US011260479B2

(12) United States Patent
    Viscardi

(10) Patent No.: US 11,260,479 B2
(45) Date of Patent: Mar. 1, 2022

(54) STATION AND METHOD FOR INSERTING A COMPONENT IN AN ASSEMBLY TO BE ASSEMBLED

(71) Applicant: COSBERG S.p.A., Bergamo (IT)

(72) Inventor: Gianluigi Carlo Viscardi, Bergamo (IT)

(73) Assignee: COSBERG S.p.A., Bergamo (IT)

( * ) Notice: Subject to any disclaimer, the term of this patent is extended or adjusted under 35 U.S.C. 154(b) by 0 days.

(21) Appl. No.: 17/241,881

(22) Filed: Apr. 27, 2021

(65) Prior Publication Data

US 2021/0245311 A1    Aug. 12, 2021

Related U.S. Application Data

(62) Division of application No. 16/323,956, filed as application No. PCT/IB2017/054569 on Jul. 27, 2017, now Pat. No. 11,020,828.

(30) Foreign Application Priority Data

Aug. 8, 2016    (IT) ................... 102016000083546

(51) Int. Cl.
    *B23P 19/00*    (2006.01)
    *B23P 19/04*    (2006.01)
    (Continued)

(52) U.S. Cl.
    CPC ........... *B23P 19/002* (2013.01); *B23P 19/001* (2013.01); *B23P 19/004* (2013.01); *B23P 19/006* (2013.01);
    (Continued)

(58) Field of Classification Search
    CPC ...... B25J 9/109; Y10T 29/24; Y10T 29/5191; Y10T 29/535
    See application file for complete search history.

(56) References Cited

U.S. PATENT DOCUMENTS

| 4,519,534 | A | * | 5/1985 | White | ................... B23P 19/006 227/117 |
| 5,072,495 | A |   | 12/1991 | Kautt | |
| 5,628,101 | A | * | 5/1997 | Liao | ...................... B23P 19/004 29/33 K |

FOREIGN PATENT DOCUMENTS

| CN | 205904658 U | 1/2017 |
| DE | 41 02 899 A1 | 8/1991 |

(Continued)

OTHER PUBLICATIONS

International Search Report and Written Opinion of the International Searching Authority for International Patent Application No. PCT/IB2017/054569 dated Nov. 13, 2017, 11 pages.

*Primary Examiner* — Jason L Vaughan
*Assistant Examiner* — Amanda Kreiling
(74) *Attorney, Agent, or Firm* — Merchant & Gould P.C.

(57) ABSTRACT

An insertion station of a component (2), for example a clevis, in a component seat (12) formed in an assembly (3) to be assembled, for example a hinge assembly for doors, includes a component ordering device (14) to order the loose components coming from a component feed hopper. A component support seat (16) receives the component and is configured in such a way as to guide the component in the horizontal insertion direction. A manipulator (20) picks a component (2) from the component ordering device (14) and deposit the component in the component support seat (16). An insertion actuator (30) has a pusher member (32) operable to push the component (2) in the component seat (12), and a positioning unit (40), including an abutment (42) operable to block the assembly (3) in a component insertion position.

3 Claims, 12 Drawing Sheets

(51) Int. Cl.
*E05D 3/14* (2006.01)
*E05D 5/12* (2006.01)
*E05D 11/10* (2006.01)

(52) U.S. Cl.
CPC ............ *B23P 19/007* (2013.01); *B23P 19/04* (2013.01); *E05D 3/142* (2013.01); *E05D 5/12* (2013.01); *E05D 11/1021* (2013.01); *E05Y 2600/50* (2013.01); *E05Y 2800/45* (2013.01); *E05Y 2900/20* (2013.01)

(56) References Cited

FOREIGN PATENT DOCUMENTS

| | | |
|---|---|---|
| EP | 0 493 147 A1 | 7/1992 |
| JP | H11-179466 A | 7/1999 |
| JP | 2002-154021 A | 5/2002 |
| WO | 2014/177979 A2 | 11/2014 |
| WO | 2014/177985 A1 | 11/2014 |

* cited by examiner

STATION AND METHOD FOR INSERTING A COMPONENT IN AN ASSEMBLY TO BE ASSEMBLED

This application is a Divisional of U.S. patent application Ser. No. 16/323,956, filed 7 Feb. 2019, which is a National Stage Application of PCT/IB2017/054569, filed 27 Jul. 2017, which claims the benefit of Serial No. 102016000083546, filed 8 Aug. 2016 in Italy, and which applications are incorporated herein by reference. To the extent appropriate, a claim of priority is made to each of the above-disclosed applications.

BACKGROUND OF THE INVENTION

The present invention relates to a station and a method for inserting a component in an assembly to be assembled.

In particular, the present invention relates to an assembly line of a furniture hinge for cabinet doors and it relates to a station and a method of inserting a "J" shaped clevis intended to connect some components of the hinge.

Automated hinge assembly lines are already known, in which one or more clevises are inserted, for example, by firing, into holes formed in components to be connected together using such clevises, which can subsequently be riveted.

In some known embodiments, the clevises are inserted along a vertical direction, such as from the top downwards. Since generally the clevises to be assembled are one or at least two (possibly opposing each other), in some embodiments, between the two insertions of the clevises, the assembly to be assembled must be rotated by 180°.

SUMMARY OF THE INVENTION

The object of the present invention is to provide a station and a method of inserting a component in an assembly to be assembled that allows optimising the assembly line, reducing in particular the operations to be carried out.

Another object of the invention is to provide a station easily adaptable and configurable based on the different sizes and types of component to be inserted, and easy to maintain.

BRIEF DESCRIPTION OF THE DRAWINGS

The features and the advantages of the station and method of inserting a component in an assembly according to the invention shall be made readily apparent from the following description of some preferred embodiments thereof, provided purely by way of a non limiting example, with reference to the accompanying drawings, in which.

DETAILED DESCRIPTION OF THE PREFERRED EMBODIMENT

Figure 1:
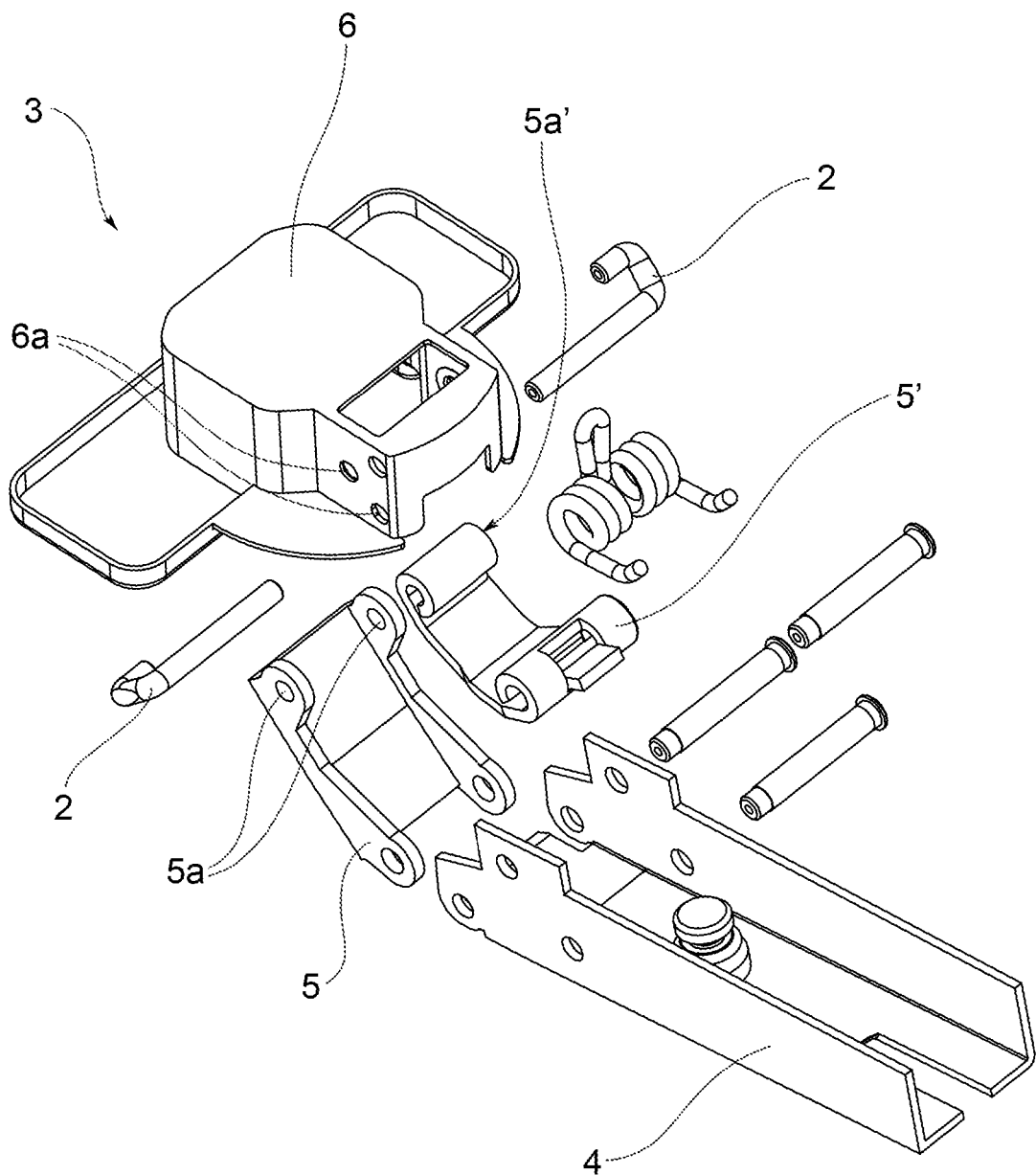
FIG. 1 shows an exploded view of an example of an assembled hinge, comprising two clevises to be inserted by the insertion station according to the invention.
Figure 2:
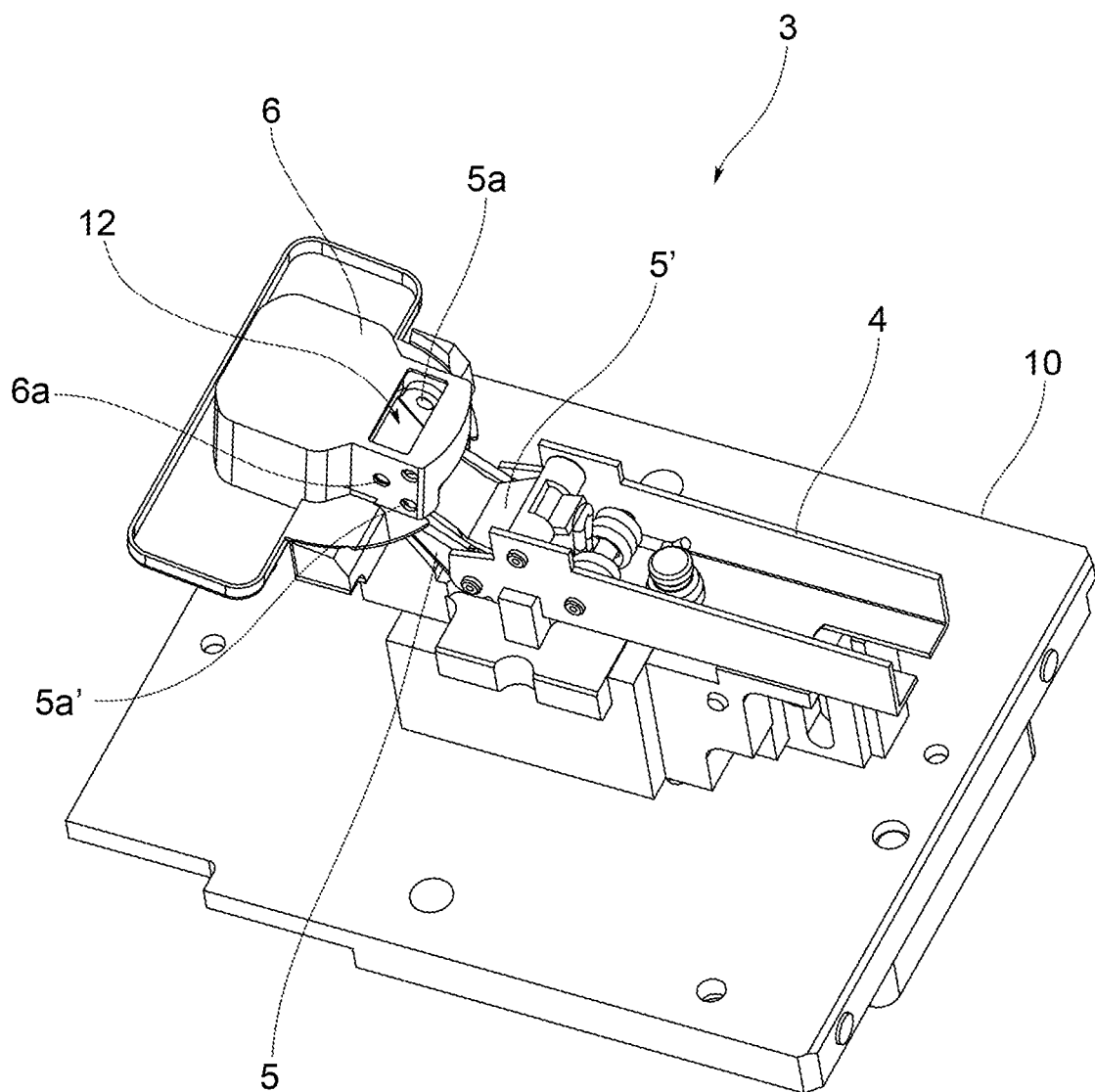
FIG. 2 shows the hinge assembly before inserting the clevises.
Figure 3:
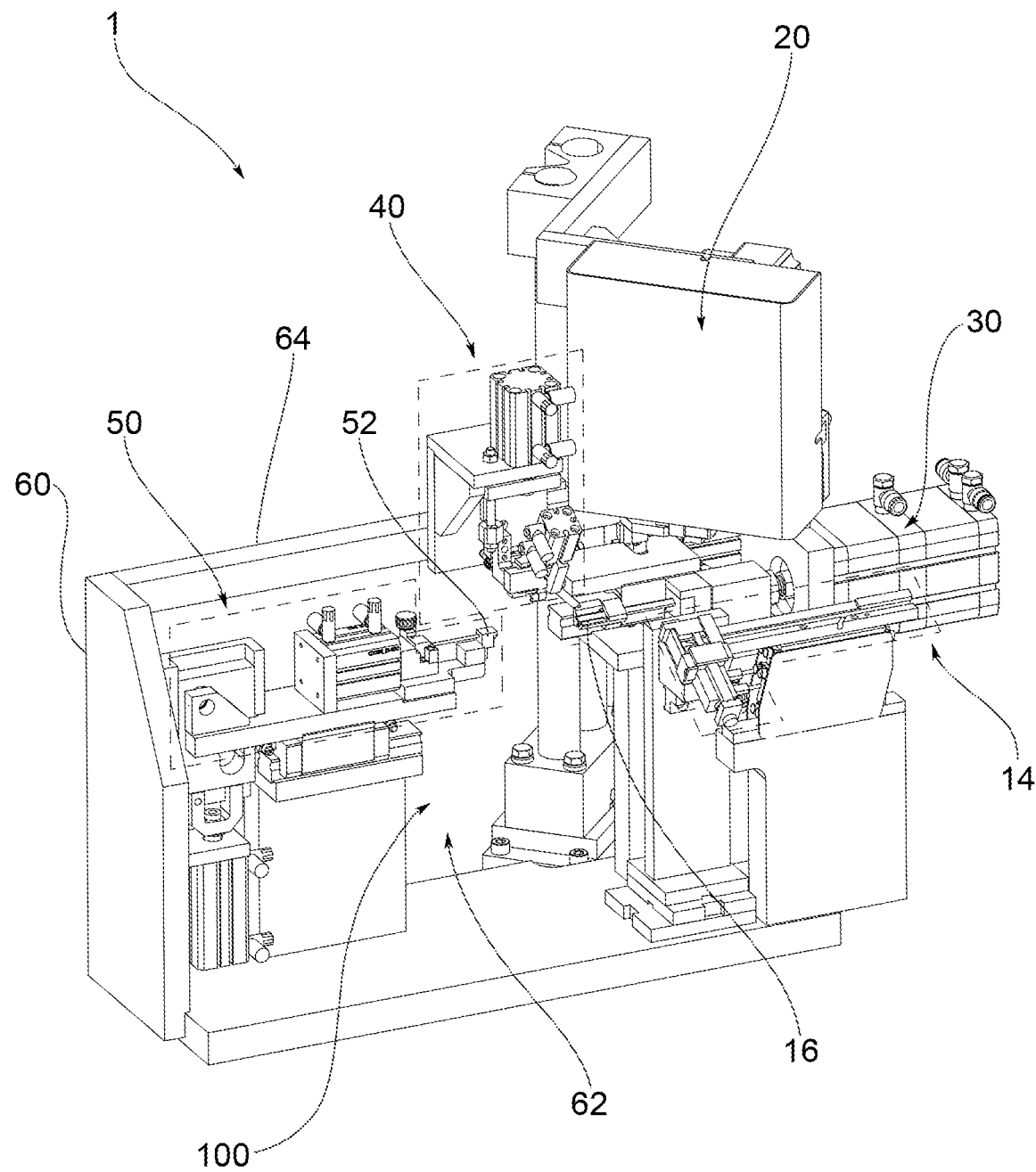
FIG. 3 is a perspective view of the insertion station according to the invention, in the absence of the hinge assembly and the relative support.
Figure 4:
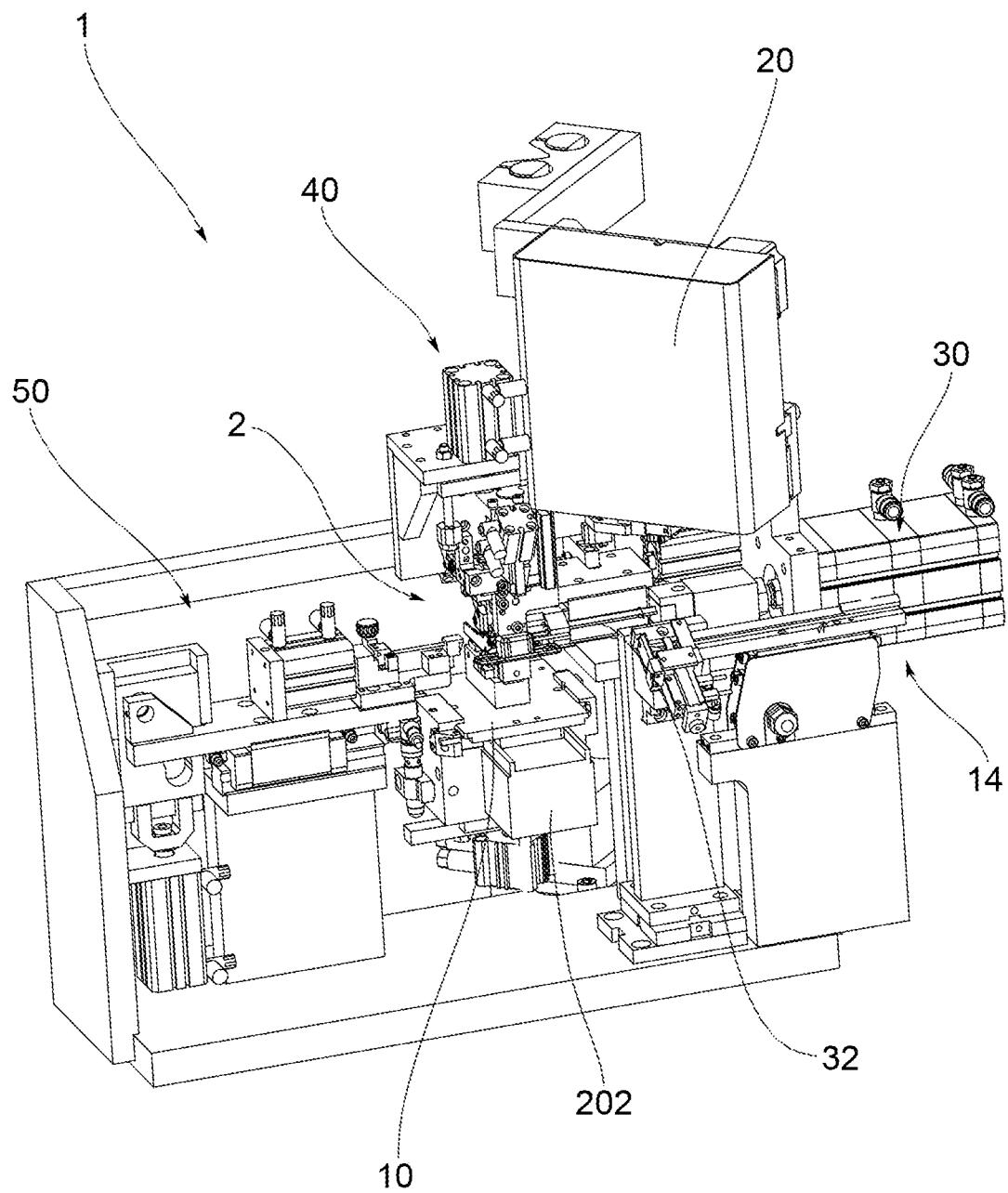
FIG. 4 is a perspective view of the insertion station with the hinge assembly positioned for inserting a clevis.
Figure 5:
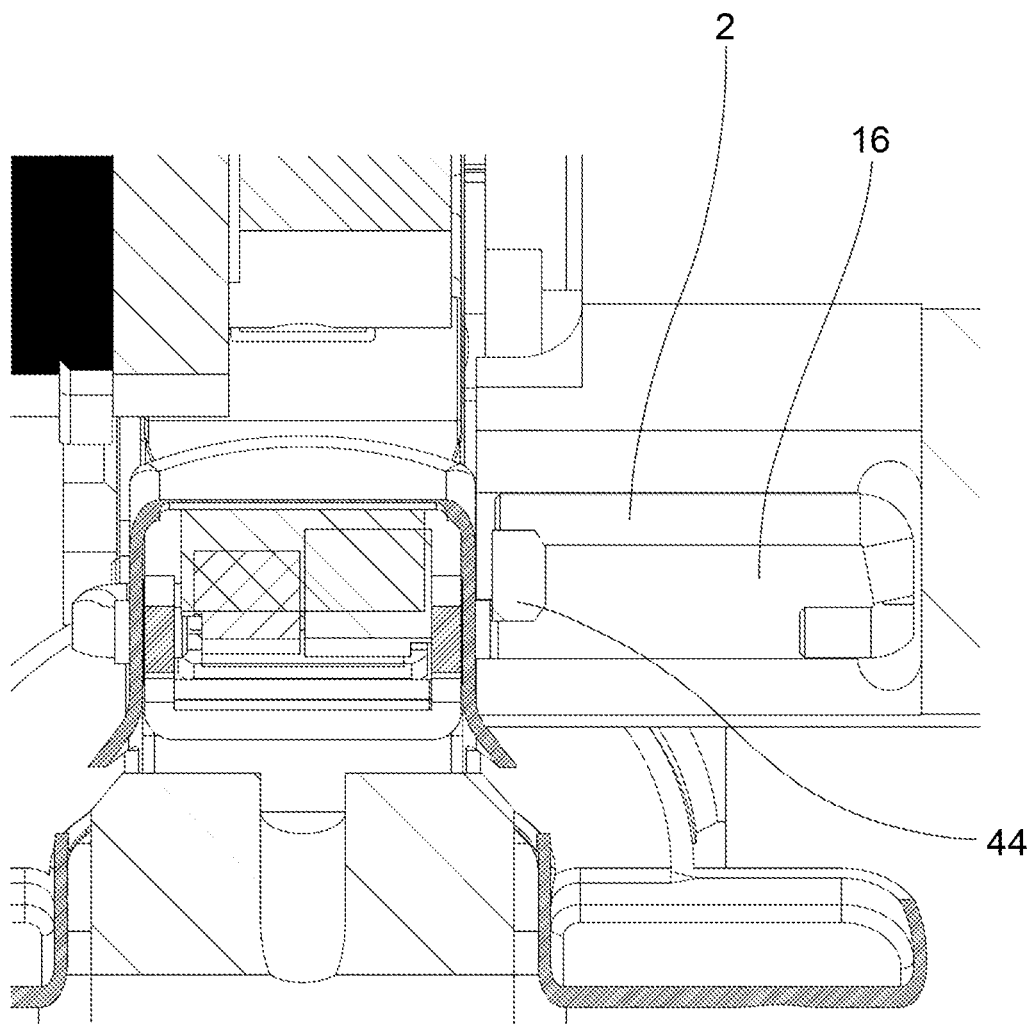
FIG. 5 shows a clevis deposited in the support seat for the insertion thereof in an hinge assembly.

In said drawings, reference numeral 1 indicates as a whole a station for inserting a component in an assembly according to the invention.

Station 1 described hereinafter is specifically designed to insert a "J" shaped clevis 2 in a hinge assembly 3 for a cabinet door. Such a hinge assembly 3, when it is ready to receive clevis 2, is formed for example by a wing 4, two plates 5, 5' already attached to wing 4, and a casing 6 (in jargon, "box") that must be hinged to plates 5, 5' and to wing 4. Therefore, wing 4, plates 5, 5' and casing 6 have respective aligned holes 5a, 5'a and 6a which define a seat 12 for clevis 2.

However, it is clear that the teaching provided by the present invention may be extended to any station that has to insert a component in an assembly to be assembled.

Therefore, hereinafter in the present invention, the terms "clevis" and "component" are interchangeable with each other. Likewise, in the case of a clevis, "assembly" means all of the elements mentioned above to make a hinge for furniture door, without losing generalisation as to the type of assembly in which a generic component should be inserted.

Assembly 3 is positioned on a support 10 so as to orient the component seat 12 for an insertion of component 2 along a horizontal insertion direction.

In a general embodiment, station 1 comprises a vibrating channel 14 suitable to order the loose components coming from a component feed hopper along a row 2.

For example, the vibrating channel 14 is implemented with piezo-electric devices.

Station 1 is provided with a component support seat 16, also referred to as "cradle" in jargon, suitable to receive component 2 and configured so as to guide component 2 in the horizontal insertion direction. The component support seat 16 is open on the side facing the component seat 12 when assembly 3 is in a stop zone 100 for inserting component 2.

In one embodiment, the component support seat 16 has a bottom wall 16' extending between two edges 16" parallel to the component insertion direction. The distance between edges 16" is equal to the width of component 2 orthogonal direction to that of insertion.

In one embodiment, station 1 comprises a seat cover 18 that, once component 2 has been deposited in the support seat 16, superiorly closes such a seat, thereby preventing any detachment of the component from the bottom wall 16', for example due vibration to which the support seat 16 may be subjected.

Station 1 is provided with a manipulator 20 suitable to pick the first component 2 from the row of components of channel 14 and deposit it in the support seat 16.

Examples of such a manipulator 20 are described in patent applications WO2014177985 and WO2014177979 on behalf of the same applicant.

Figure 6:
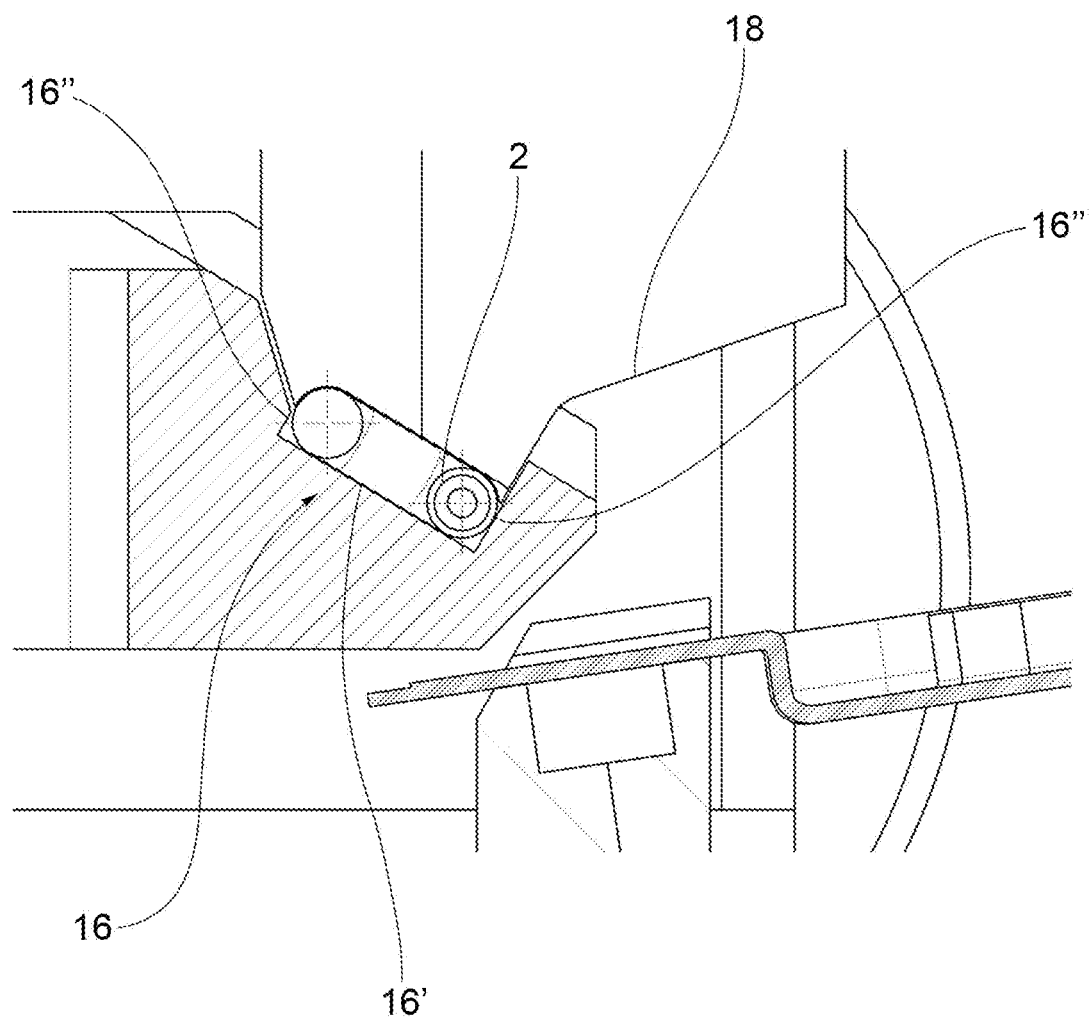
FIG. 6 shows an end view of the clevis in the closed support seat.

In one embodiment shown in FIG. 6, the seat cover 18 is a member of manipulator 20.

Station 1 further comprises an insertion actuator 30 having a pusher member 32 operable to push component 2 in the component seat 12.

Station 1 further comprises a positioning unit 40. Such a positioning unit 40 is provided with abutment means 42 operable to block assembly 3 in the component insertion position.

According to an embodiment, station 1 further comprises a centring unit 50 provided with centring means 52 operable for aligning parts of the assembly that interact with each other to form the component seat.

Figure 8:
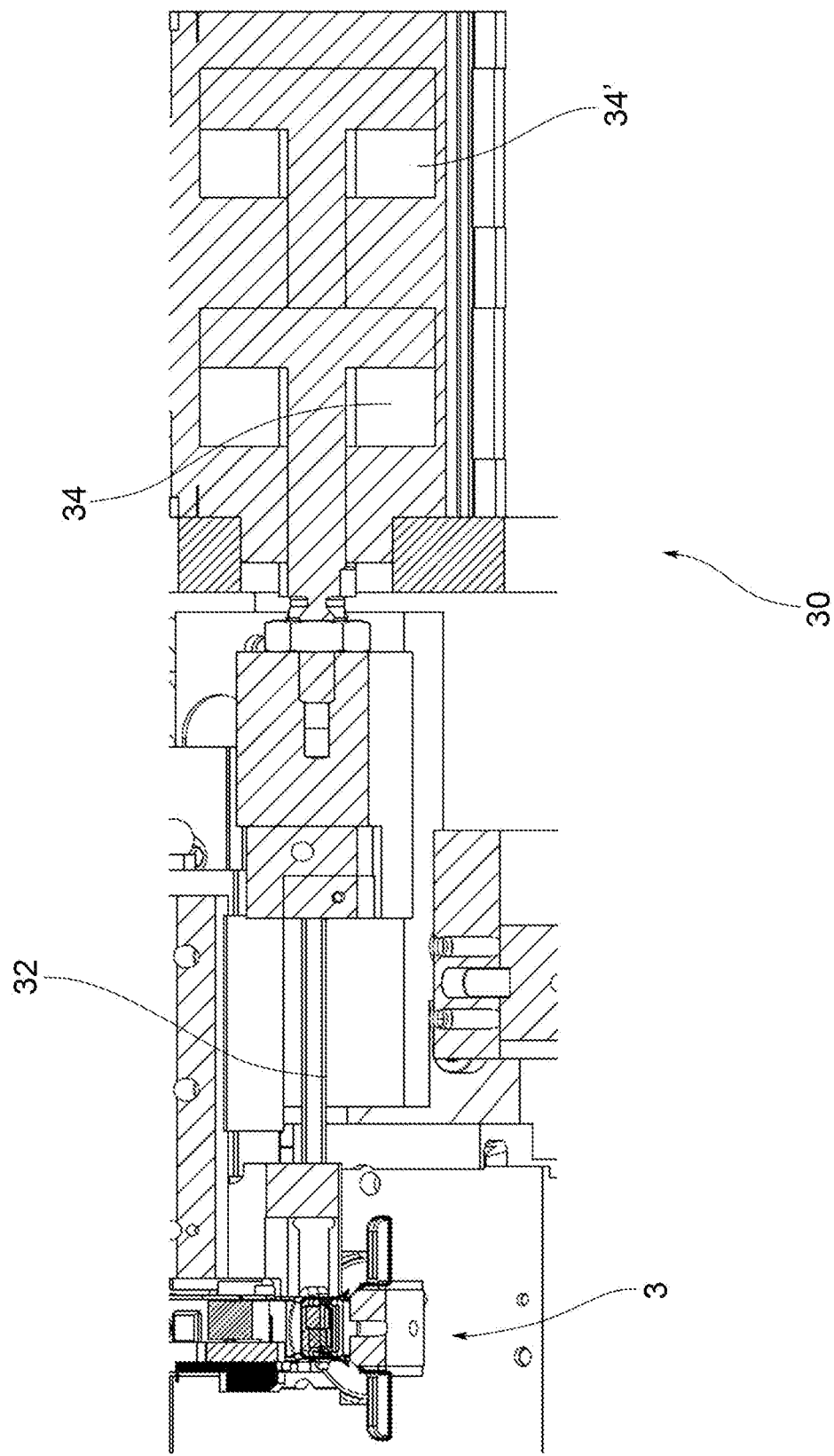
FIG. 8 shows a sectional view of the insertion actuator.

According to an embodiment shown in particular in FIG. 8, the insertion actuator 30 is a dual stroke device, for example implemented with a pneumatic cylinder, positioned behind the support seat 16 in the component insertion direction. In this case, the pusher member 32 consists of the rod of the pneumatic cylinder 30.

Rod 32 is suitable to slide in the support seat 16 during the thrust of component 2 in the component seat 12.

In one embodiment, the insertion actuator 30 is provided with two actuator chambers 34, 34' arranged in series. In this way, the insertion actuator 30 may operate with two successive strokes of the pusher member 32, ensuring a correct insertion of component 2 into seat 12 thereof, also when component 2 is inaccurate and, with a single stroke, could be fit bent into seat 12 thereof.

In one embodiment, the positioning unit 40 is placed above the stop zone 100 of the assembly. In this case, the abutment means 42 are vertically movable between an inactive raised position and a lowered locking position of the assembly.

Figure 7:
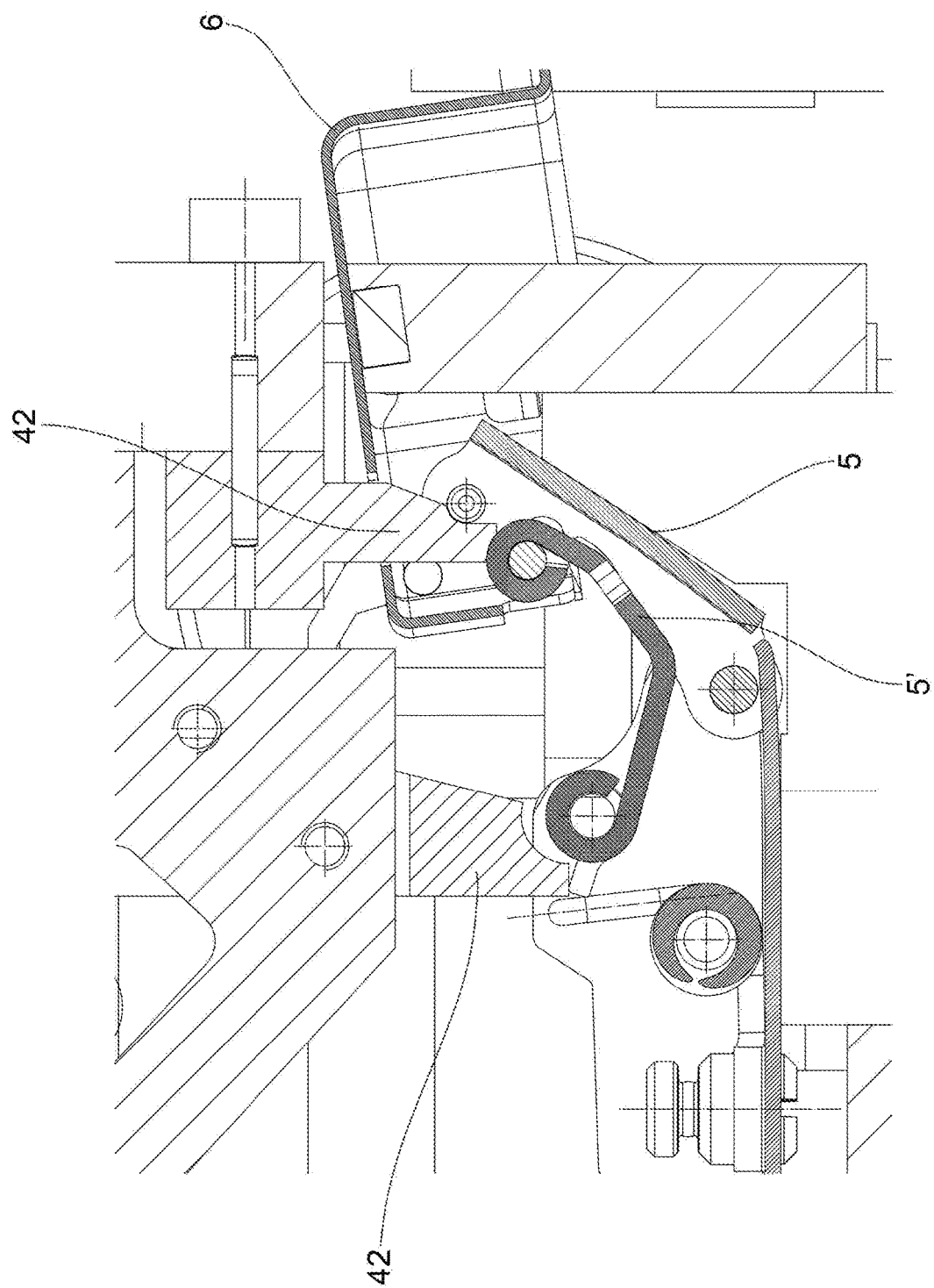
FIG. 7 shows a sectional view of the positioning unit in action on the hinge assembly components.

FIG. 7 shows the abutment means 42 lowered on assembly 3.

For example, the abutment means 42 move plate 5' into position, which deforms elastically up to assuming the insertion position of clevis 2. In this case, one of the abutment means 42 pushes one end of plate 5', while the other acts as an abutment by acting on the other end of plate 5'.

In one embodiment, the positioning unit 40 further comprises a guide member 44 suitable to engage component 2 during insertion in the component seat 12. This guide member 44 like the abutment means 42 is movable at least in a direction orthogonal to the insertion direction.

Figure 9:
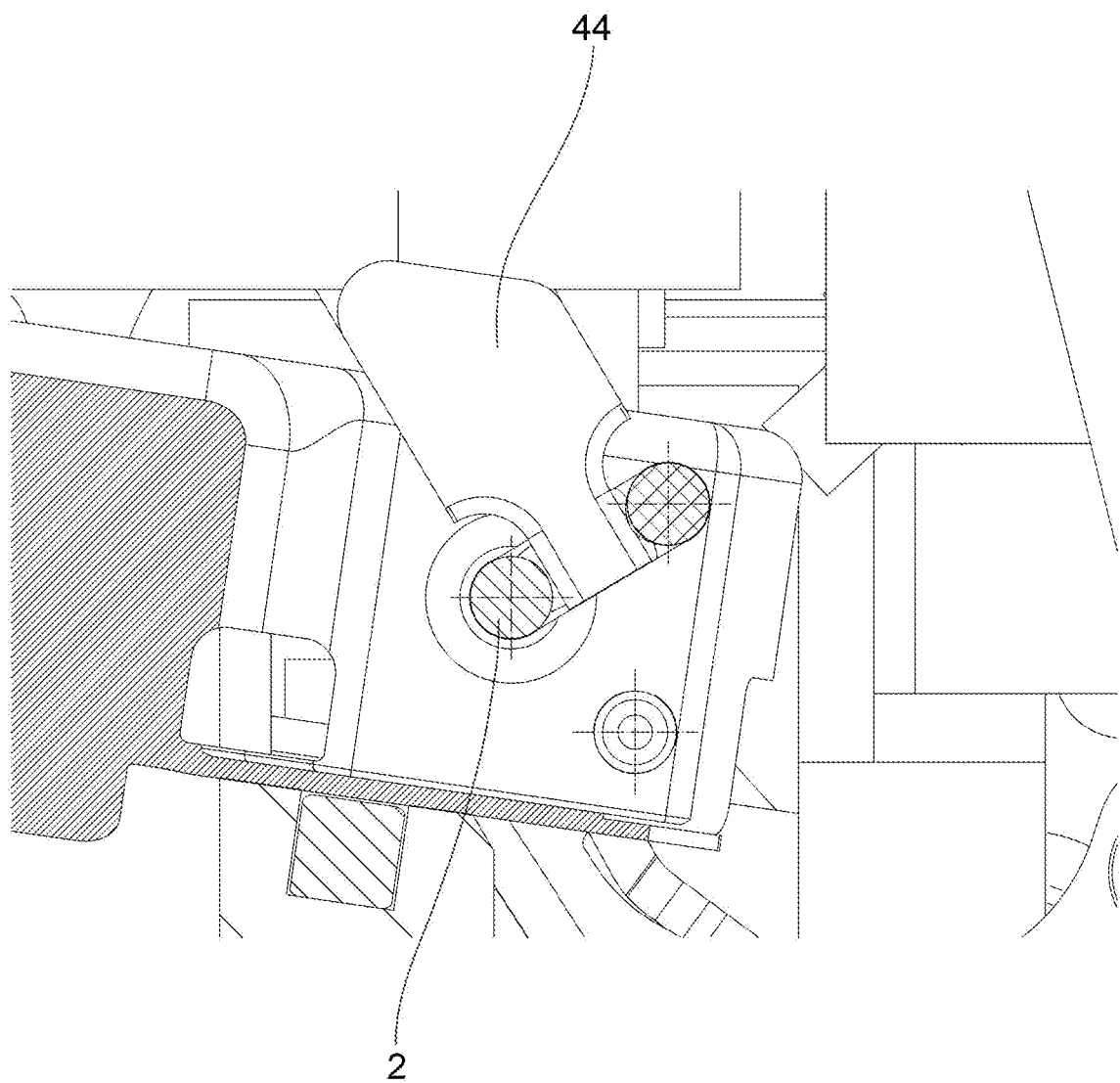
FIG. 9 shows a member for guiding the clevis in active position.

In the cases of insertion of a J-shaped clevis, in one embodiment the guide member 44 comprises a guide rod suitable to be inserted in the hook area of clevis 2 (FIG. 9).

This guide rod serves as a guide and support for the clevis not to drop it during the insertion between the hinge components.

Moreover, in one embodiment, the guide rod serves to accompany the insertion of clevis 2 in the two insertion steps operated by the dual stroke actuator 30.

In one embodiment, the centring unit 50 is placed alongside the assembly stop zone 100 opposite the support seat 16. The centring means 52 are movable along a direction that is parallel to the insertion direction between an inactive retracted position and an advanced engagement position of assembly 3.

Figure 10:
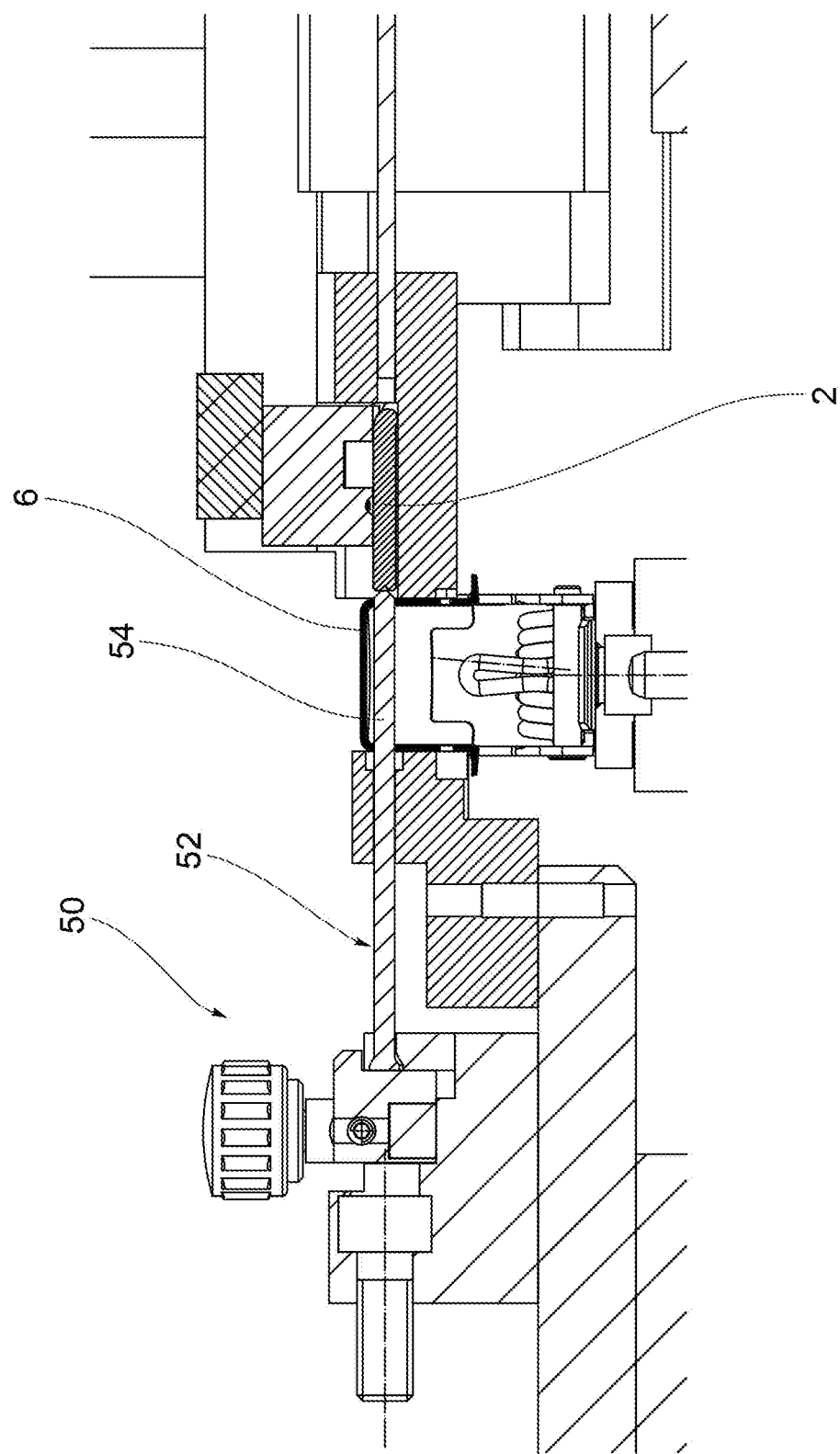
FIG. 10 shows a sectional view of the centring unit.

In one embodiment shown in FIG. 10, the centring means comprise a centring rod 54 that when in the advanced active position, crosses the components of assembly 3 and goes in abutment with clevis 2.

In one embodiment, the centring rod 54 is pushed to the retracted inactive position by the same clevis 2 during the insertion thereof into the clevis seat 12.

In a preferred embodiment, station 1 comprises a support bench 60 shaped as a bridge so as to delimit a central opening 62 suitable to allow the passage of a transport system 200 of the assembly.

The assembly stop zone 100 is opposite the central opening 62.

In other embodiments, the support bench 60 may have a "C" or "U" shape.

In one embodiment, the support seat 16, manipulator 20, the insertion actuator 30 and the centring unit 50 are supported by the support bench 60 laterally with respect to the assembly stop zone 100.

The positioning unit 40 is instead supported by a horizontal crosspiece 64 of the support bench 60.

According to an embodiment, station 1 further comprises, in the assembly stop zone 100, a portion 202 of the transport system 200 of assembly 3. The assembly support 10 is placed on such a portion 202.

In other words, the insertion station 1 comprises a part of the transport system 200 that, when the station is inserted into the assembly plant, connects to a portion upstream and to a portion downstream of the transport system 200 of the plant, so as to achieve a continuous transport system.

In an advantageous embodiment, portion 202 of the transport system is provided with means for adjusting the position of the assembly support 10.

In this way, the insertion station 1 may be pre-configured according to the assembly to be assembled and thus according to the features of the assembly plant, before inserting the insertion station 1 in the plant itself.

The operation of the insertion station 1 is as follows.

The assembly receiving component 2 is positioned on the assembly support 10 in such a way that the component seat 12 is substantially horizontal.

Moreover, the component seat 12 is aligned, for example using the centring unit 50, at the end of the support seat 16 so as to achieve a substantial continuity between the component seat 12 and the support seat 12.

The loose components coming from a feed hopper 80 are ordered along a row through the vibrating channel 14.

Manipulator 20 picks up the first component 2 in the row and deposits it in the component support seat 16 already with an orientation that corresponds to that taken by the component after the insertion in the component seat.

The positioning unit 40 blocks assembly 3 in the correct component insertion position.

Figure 11:
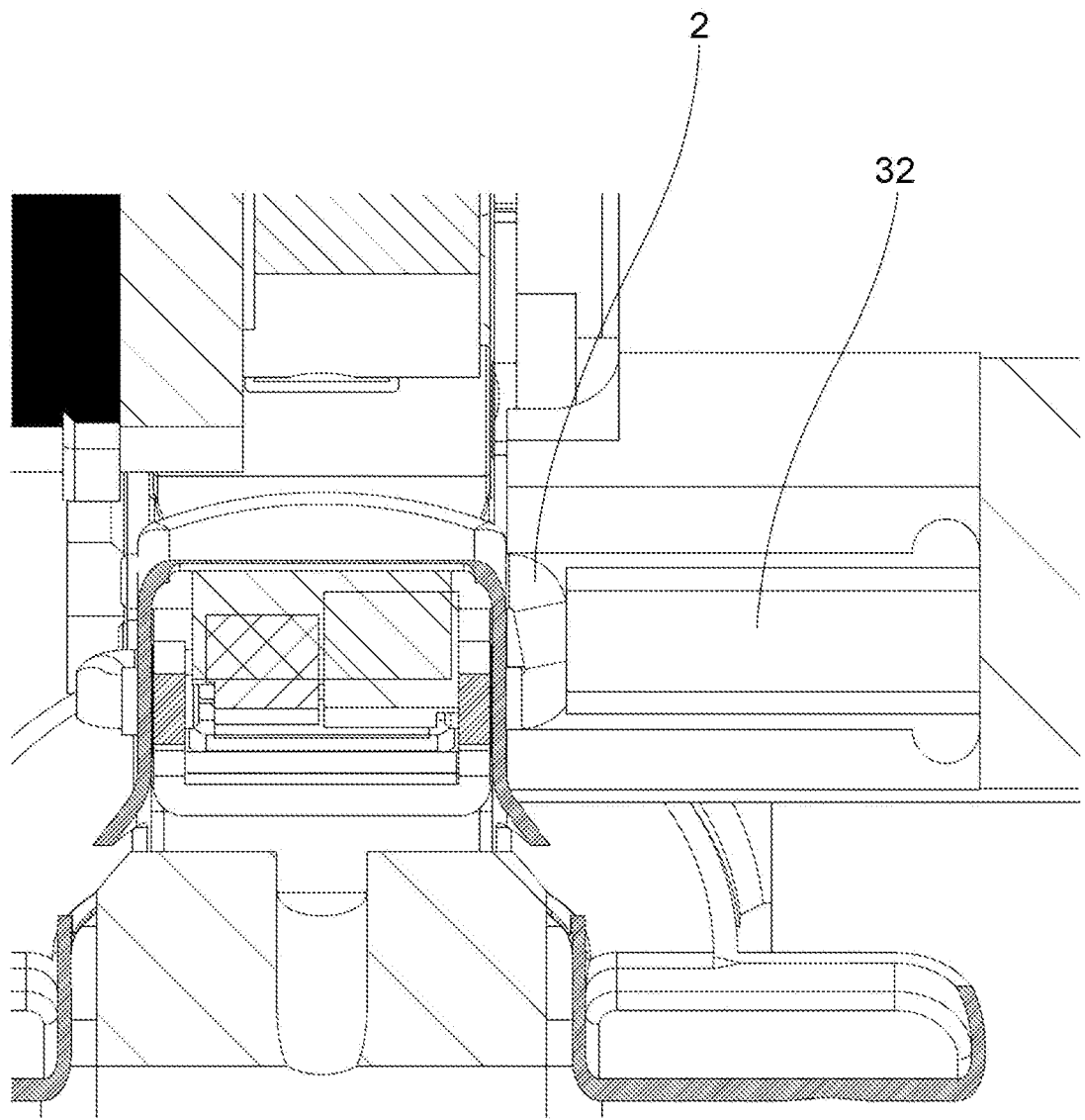
FIG. 11 shows a detail of the station at the end of the clevis insertion.

At this point, the insertion actuator 30 pushes component 2 along the insertion direction up to a complete insertion thereof into the component seat 12 (FIG. 11).

In the case of insertion of a J-shaped clevis, in one embodiment, when inserting clevis 2 in the component seat 12, the guide rod 44 is operated so as to fit into the hook area of clevis 2 (FIG. 9).

According to an embodiment, before carrying out the operation of inserting component 2 in the component seat 12, the station is configured in such a way as to be ready to be operatively inserted in the assembly plant.

It is clear that the station described allows achieving all the intended objects.

Figure 12:
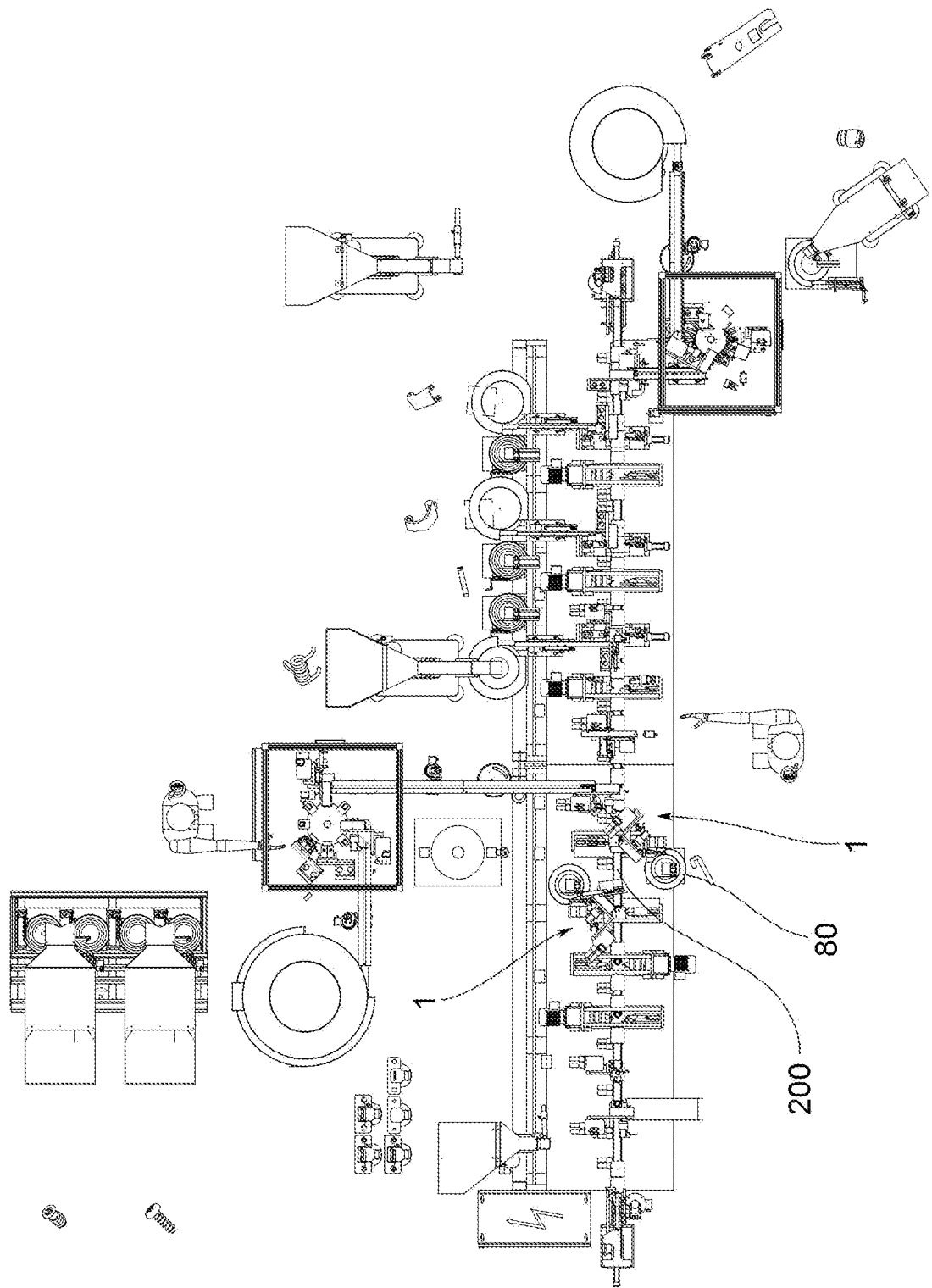
FIG. 12 shows a plan view of an example of an assembly plant using two insertion stations of respective clevises according to the invention.

In particular, the station is configured in such a way that it is possible to insert component 2 along a horizontal direction (orthogonal to the movement direction of the assembly along the transport system). This allows inserting two clevis opposed each other without having to take back the assembly after the first insertion. As can be seen in FIG. 12 that represents part of the plant, along the assembly line are two insertion stations 1 equal to each other and placed immediately downstream of the other.

Through the positioning and centring units, the station is easily adaptable to different assemblies to be assembled.

In a preferred embodiment, the station forms an assembled monobloc, which allows a calibration and centring thereof externally to the plant and which can thus be inserted in the plant already ready for use.

The station is easy to maintain. For example, the centring unit is removable without tools.

If the transport system comprises a conveyor belt, the possibility of integrating a portion of the transport system in the station allows for quick configuration of the overall plant, since the station can be pre-configured according to the features of the plant itself. Moreover, such a structure of the station allows the plant to operate also in the absence of the station.

The station allows obtaining significant energy savings, since it does not use a pneumatic firing of system of the component.

A man skilled in the art may make several changes, adjustments, adaptations and replacements of elements with other functionally equivalent ones to the embodiments of the insertion station according to the invention in order to meet incidental needs, without departing from the scope of the following claims. Each of the features described as belonging to a possible embodiment can be obtained independently of the other embodiments described.

What is claimed is:

1. Method of inserting a component, in a component seat formed in an assembly to be assembled, by an insertion station, the insertion station comprising:
   a support for positioning said assembly to orient the component seat for insertion of the component along a horizontal insertion direction;
   a component orderer to order loose components coming from a component feed hopper;
   a component support seat to receive the component and configured to guide the component in said horizontal insertion direction, said support seat being open on a side facing the component seat when the assembly is in a stop zone for the insertion of the component;
   a manipulator to pick a component from the component orderer and deposit the component in said component support seat;
   an insertion actuator having a pusher member operable to push the component in the component seat;
   a positioning unit, comprising a blocker operable to block the assembly in a component insertion position,
   wherein the positioning unit is placed above the stop zone of the assembly, and wherein the blocker is movable vertically between an inactive raised position and a lowered position of blocking the assembly; the method comprising the steps of:
      positioning said assembly on a support to align the component seat to an end of the support seat and to achieve a substantial continuity between the component seat and the support seat;
      ordering the loose components coming from the component feed hopper;
      picking a component and depositing the component in the component support seat with an orientation corresponding to an orientation assumed by the component at the end of the insertion in the component seat;
      blocking the assembly in the component insertion position;
      pushing the component along the insertion direction until complete insertion of the component in the component seat.

2. Method according to claim 1, further comprising a step of aligning the component seat to the component support seat.

3. Method according to claim 1, further comprising a step of guiding the component during insertion in the component seat.

* * * * *